US010091255B2

(12) United States Patent
Noldus

(10) Patent No.: US 10,091,255 B2
(45) Date of Patent: Oct. 2, 2018

(54) LOCAL CONTROL OF ADDITIONAL MEDIA SESSION FOR A PACKET BASED CALL

(71) Applicant: Telefonaktiebolaget L M Ericsson (publ), Stockholm (SE)

(72) Inventor: Rogier August Caspar Joseph Noldus, Goirle (NL)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 350 days.

(21) Appl. No.: 14/784,268

(22) PCT Filed: Apr. 15, 2013

(86) PCT No.: PCT/EP2013/057790
§ 371 (c)(1),
(2) Date: Oct. 13, 2015

(87) PCT Pub. No.: WO2014/169937
PCT Pub. Date: Oct. 23, 2014

(65) Prior Publication Data
US 2016/0057178 A1    Feb. 25, 2016

(51) Int. Cl.
*G06F 15/16* (2006.01)
*H04L 29/06* (2006.01)
(Continued)

(52) U.S. Cl.
CPC ...... *H04L 65/1083* (2013.01); *H04L 65/1006* (2013.01); *H04L 65/1016* (2013.01);
(Continued)

(58) Field of Classification Search
CPC .................. H04L 65/1016; H04L 65/1073
See application file for complete search history.

(56) References Cited

U.S. PATENT DOCUMENTS 9,330,398 B2 *  5/2016  Klein ................. G06Q 30/0208
2007/0091898 A1 *  4/2007  Rengaraju ......... H04L 29/06027
                                                370/395.21
(Continued)

OTHER PUBLICATIONS

International Search Report, Application No. PCT/EP2013/057790, dated Jan. 7, 2014.
(Continued)

*Primary Examiner* — Yves Dalencourt
(74) *Attorney, Agent, or Firm* — Sage Patent Group

(57) ABSTRACT

A user equipment (UE) engages in a packet based call between a local party associated with the UE and a remote party. The UE establishes a control plane session of the call with a node of an Internet Protocol multimedia system (IPMS), and establishes a media session of the call managed by the IPMS. The UE determines a local endpoint for terminating an additional media session at the local party, and sends a first message of the control plane session to the IPMS. The first message indicates the local endpoint and indicates that management of the additional media session by the IPMS is not required. The UE receives a second message of the control plane session from the IPMS that indicates a remote endpoint for terminating the additional media session at the remote party. The UE configures the local endpoint for transfer of media with the indicated remote endpoint.

30 Claims, 13 Drawing Sheets

(51) Int. Cl.
   *H04W 36/00*    (2009.01)
   *H04W 92/02*    (2009.01)
(52) U.S. Cl.
   CPC ...... *H04L 65/1069* (2013.01); *H04L 65/1089* (2013.01); *H04W 36/0022* (2013.01); *H04W 92/02* (2013.01)

(56) References Cited

U.S. PATENT DOCUMENTS

| | | | | |
|---|---|---|---|---|
| 2008/0049648 | A1* | 2/2008 | Liu | H04L 65/1016 370/310 |
| 2010/0191829 | A1 | 7/2010 | Cagenius | |
| 2010/0312841 | A1* | 12/2010 | Doken | H04L 65/4015 709/206 |
| 2011/0116495 | A1 | 5/2011 | Purkayastha et al. | |
| 2012/0084356 | A1 | 4/2012 | Ferdi | |

OTHER PUBLICATIONS

Written Opinion of the International Searching Authority, Application No. PCT/EP2013/057790, dated Jan. 7, 2014.

3GPP, Technical Specification, "3rd Generation Partnership Project; Technical Specification Group Services and System Aspects; IP Multimedia Subsystem (IMS); Stage 2 (Release 12)", 3GPP TS 23.228 V12.0.0 (Mar. 2013), 290 pp.

3GPP, Technical Specification, "3rd Generation Partnership Project; Technical Specification Group Services and System Aspects; IP Multimedia Subsystem (IMS) service Continuity enhancements; Service, policy and interaction; Stage 2 (Release 9)", 3GPP TR 23.838 V1.1.0 (Apr. 2009), 53 pp.

Handley et al., "SDP: Session Description Protocol", Network Working Group; Request for Comments: 4566; Obsoletes: 2327, 3266; Category: Standards Track, Jul. 2006, 49 pp.

International Telecommunication Union "Series H: Audiovisual and Multimedia Systems Infrastructure of audiovisual services— Communication procedures—Gateway Control protocol: Version 2", ITU-T Recommendation H.248.1, May 2002, 150 pp.

International Telecommunication Union "Series H: Audiovisual and Multimedia Systems Infrastructure of audiovisual services— Coding of moving video—Video coding for low bit rate communication", ITU-T Recommendation H.263, Jan. 2005, 226 pp.

Stähle et al., "Real-Time Multimedia Session Splitting and Seamless Mobility in Session Initiation Protocol Environments", *MMEDIA 2011: The Third International Conferences on Advances in Multimedia*, Budapest, Hungary, Apr. 17-22, 2011, pp. 136-141.

* cited by examiner

```
Session Information
    Session Description Protocol Version (v): 0
    Connection Information (c): IN IP4 164.48.62.71
    Owner/Creator, Session Id (o): 9400 123456 4 IN IP4 164.48.62.71
    Session Name (s): A conversation
    Time Description, active time (t): 0 0

Managed Media Stream
    Media Description, name and address (m): audio 7078 RTP/AVP 0 98 8 101
    Media Attribute (a): rtcp:7079
    Media Attribute (a): sendrecv
    Media Attribute (a): rtpmap:98 iLBC/8000
    Media Attribute (a): rtpmap:101 telephone-event/8000
    Media Attribute (a): fmtp:101 0-15

Unmanaged Media Stream
    Media Description, name and address (m): video 56076 RTP/AVP 34 115
    Connection Information (c): IN IP4 201.53.22.23 /unmanaged
    Media Attribute (a): unmanaged
    Media Attribute (a): rtpmap:34 H263/90000
    Media Attribute (a): fmtp:34 QCIF=1;CIF=1;VGA=2
    Media Attribute (a): rtpmap:115 H263-1998/90000
    Media Attribute (a): fmtp:115 QCIF=1;CIF=1;VGA=2;I=1;J=1;T=1
    Media Attribute (a): sendrecv
    Media Attribute (a): candidate:1 1 UDP 659136 201.53.22.23 56076 typ host
    Media Attribute (a): candidate:1 2 UDP 659134 201.53.22.23 56077 typ host
```

FIG. 4

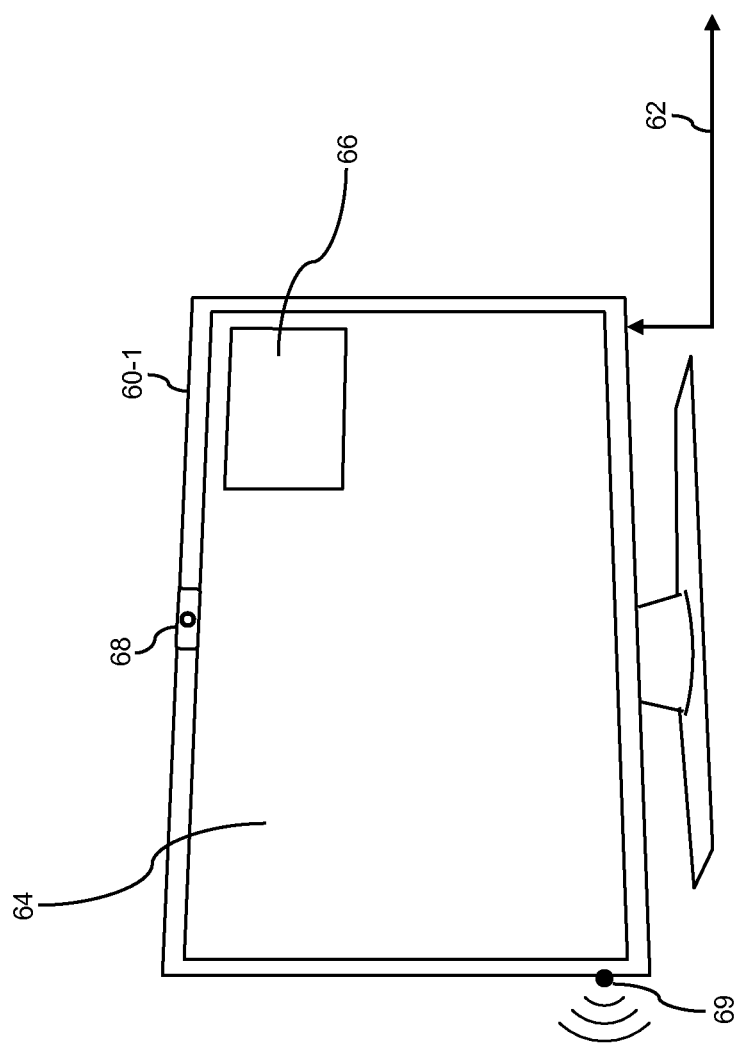

LOCAL CONTROL OF ADDITIONAL MEDIA SESSION FOR A PACKET BASED CALL

CROSS REFERENCE TO RELATED APPLICATION

This application is a 35 U.S.C. § 371 national stage application of PCT International Application No. PCT/EP2013/057790, filed on Apr. 15, 2013, the disclosure and content of which is incorporated by reference herein in its entirety. The above-referenced PCT International Application was published in the English language as International Publication No. WO 2014/169937 A1 on Oct. 23, 2014.

TECHNICAL FIELD

The present invention relates to methods of controlling a packet based call and to corresponding devices.

BACKGROUND

Communication networks are currently evolving from circuit switched (CS) networks towards packet switched (PS) networks, in particular Internet Protocol (IP) based networks. For example, the LTE (Long Term Evolution) radio access technology as specified by 3GPP ($3^{rd}$ Generation Partnership Project) no longer supports CS connections to a user equipment (UE) but only IP based PS connections. To offer voice support, also technologies allowing voice communication over PS connections have been introduced. Examples of such technologies are VoIP (Voice over IP) and more specifically VoLTE (Voice over LTE).

In addition to voice communication, also enhanced multimedia services may be supported for packet based calls. For example, a mobile network may be augmented with an IMS (IP Multimedia Subsystem) as specified in 3GPP Technical Specification (TS) 23.228 V12.0.0. The IMS allows for establishing a voice call that is augmented with multimedia features. For example, the voice communication of the call may be supplemented by exchange of multimedia content, such as pictures, video clips, text messages, or the like, between the call parties. For exchanging such multimedia content during the call, additional media sessions may be formed in a user plane of the call. Such additional user plane media sessions may be used for conveying media streams with the multimedia content. The control plane of the call and the user plane with all media sessions are managed by the IMS. If the end devices of the call are mobile phones or some other type of UE for the mobile network, the control plane and the user plane of the call are carried over infrastructure of the mobile network, e.g., the radio access network and core network.

However, in some cases such multimedia enhancements as provided by the IMS may not be utilized to the full extent. For example, the UE may not be able to use multimedia content in the form of a real-time video due to limited capacity of the radio access network or due to limited capacity of the core network. Further, limited display size or processing power of the UE may prevent adequate rendering of the multimedia content on the UE.

In order to address capacity limitations of the mobile network, solutions have been developed in which the data traffic of the call is offloaded to an alternative access network supported by the UE, e.g., to a Wireless Local Area Network (WLAN). In such cases, both the control plane and all media planes of the call would be established over the alternative access network. Further, the operator of the mobile network would still manage the offloaded traffic, e.g., by initiating charging or Quality of Service (QoS) control, or the like. However, this typically requires integrated infrastructure of the mobile network and the alternative access network, which is not always available.

Still further, for example "Real-Time Multimedia Session Splitting and Seamless Mobility in Session Initiation Protocol Environments" by T. Stähle et al., MMEDIA 2011: The Third International Conference on Advance in Multimedia", IARIA, 2011, describes techniques which allow for splitting media streams of a VoIP call between multiple Session Initiation Protocol devices. However, such techniques require SIP support in all involved devices. Further, in these techniques usage of network based control instances such as the IMS is not considered at all.

Accordingly, there is a need for techniques which allow for improved utilization of multimedia enhancements of a packet based call.

SUMMARY

According to an embodiment of the invention, a method of controlling a packet based call between a local party and a remote party is provided. According to the method, a UE associated with the local party establishes a control plane session of the call with an IP multimedia system. Further, the UE establishes a media session of the call. The media session is managed by the IP multimedia system. The UE determines a local endpoint for terminating an additional media session at the local party. The UE sends a first message of the control plane session to the IP multimedia system. The first message indicates the local endpoint. In addition, the first message indicates that management of the additional media session by the IP multimedia system is not required. Further, the UE receives a second message of the control plane session from the IP multimedia system. The second message indicates a remote endpoint for terminating the additional media session at the remote party.

The UE configures the local endpoint for transfer of media with the indicated remote endpoint.

According to a further embodiment of the invention, a method of controlling a packet based call between a local party and a remote party is provided. According to the method, a node of an IP multimedia system establishes a control plane session of the call with a UE associated with the local party. Further, the node manages a media session of the call. The node receives a first message of the control plane session from the UE. The first message indicates a local endpoint for terminating an additional media session at the local party. Further, the first message indicates that management of the additional media session by the IP multimedia system is not required. Further, the node sends a second message of the control plane session to the UE. The second message indicates a remote endpoint for terminating the additional media session at the remote party.

According to a further embodiment of the invention, a UE is provided. The UE comprises at least one interface and at least one processor. The at least one processor is configured to establish, via the at least one interface, a control plane session of a call with an IP multimedia system. The call is between a local party associated with the UE, and a remote party. Further, the at least one processor is configured to establish, via the at least one interface, a media session of the call. The media session is managed by the IP multimedia system. Further, the at least on processor is configured to determine a local endpoint for terminating an additional media session at the local party. Further, the at least one processor is configured to send, via the at least one interface, a first message of the control plane session to the IP multimedia system. The first message indicates the local endpoint of the additional media session. Further, the first message indicates that management of the additional media session by the IP multimedia system is not required. Further, the at least one processor is configured to receive, via the at least one interface, a second message of the control plane session from the IP multimedia system. The second message indicates a remote endpoint for terminating the additional media session at the remote party. Further, the at least one processor is configured to configure the local endpoint for transfer of media with the indicated remote end point.

According to a further embodiment of the invention, a node for an IP multimedia system is provided. The node comprises at least one interface and at least one processor. The at least one processor is configured to establish, via the at least one interface, a control plane session of a call with a UE. The call is between a local party associated with the UE, and a remote party. Further, the at least one processor is configured to manage a media session of the call. Further, the at least one processor is configured to receive, via the at least one interface, a first message of the control plane session from the UE. The first message indicates a local endpoint for terminating an additional media session at the local party. Further, the first message indicates that management of the additional media session by the IP multimedia system is not required. Further, the at least one processor is configured to send, via the at least one interface, a second message of the control plane session to the UE. The second message indicates a remote endpoint for terminating the additional media session at the remote party.

According to a further embodiment of the invention, a computer program product is provided. The computer program product comprises program code to be executed by at least one processor of a UE. Execution of the program code causes the UE to establish a control plane session of a call with an IP multimedia system. The call is between a local party associated with the UE, and a remote party. Further, execution of the program code causes the UE to establish a media session of the call. The media session is managed by the IP multimedia system. Further, execution of the program code causes the UE to determine a local endpoint for terminating an additional media session at the local party. Further, execution of the program code causes the UE to send a first message of the control plane session to the IP multimedia system. The first message indicates the local endpoint of the additional media session. Further, the first message indicates that management of the additional media session by the IP multimedia system is not required. Further, execution of the program code causes the UE to receive a second message of the control plane session from the IP multimedia system. The second message indicates a remote endpoint for terminating the additional media session at the remote party. Further, execution of the program code causes the UE to configure the local endpoint for transfer of media with the indicated remote end point.

According to a further embodiment of the invention, a computer program product is provided. The computer program product comprises program code to be executed by at least one processor of a node of an IP multimedia system. Execution of the program code causes the node to establish a control plane session of a call with a UE. The call is between a local party associated with the UE, and a remote party. Further, execution of the program code causes the node to manage a media session of the call. Further, execution of the program code causes the node to receive a first message of the control plane session from the UE. The first message indicates a local endpoint for terminating an additional media session at the local party. Further, the first message indicates that management of the additional media session by the IP multimedia system is not required. Further, execution of the program code causes the node to send a second message of the control plane session to the UE. The second message indicates a remote endpoint for terminating the additional media session at the remote party.

BRIEF DESCRIPTION OF THE DRAWINGS

FIG. 4 shows an example of session information in accordance with an embodiment of the invention.

FIG. 5 shows an exemplary device which may be used as endpoint of an additional media session of the call.

DETAILED DESCRIPTION OF EMBODIMENTS

In the following, concepts according to embodiments of the invention will be explained in more detail with reference to the accompanying drawings. The illustrated concepts relate to controlling a packet based call between a first party and a second party. In the illustrated embodiments, it is assumed that the call is managed by IMS infrastructure of a communication network, e.g., by a Multimedia Telephony (MMTel) service provided by the IMS. The communication network may specifically be a mobile network implemented on the basis of one or more cellular radio access technologies, e.g., LTE and/or UTRA (Universal Mobile Telecommunications System Terrestrial Radio Access) with HSPA (High Speed Packet Access). However, it is to be understood that the concepts could also be implemented in other types of communication networks, using other types of access technology, and with other types of IP multimedia system.

In the illustrated concepts, the IMS may be used for establishing and managing a control plane and a user plane of the call. The control plane and the user plane are established between a UE of the first party and a UE of the second party. Such UE may for example be implemented by an IMS enabled mobile phone or smartphone, or by some other type of IMS enabled device. This may be accomplished according to the corresponding IMS procedures, using SIP signaling. The user plane may in particular include a media session for conveying voice data between the parties. Further, an additional user plane is established between the parties. This may be accomplished by updating SDP (Session Description Protocol) information of the call. The additional user plane may carry one or more additional media sessions, e.g., with multimedia content such as video or messages. Further, the additional media session may also be used for file transfer between the parties. The additional user plane is not managed by the IMS. Rather, endpoints of the additional user plane at the parties may be locally configured for establishing the additional media session. Accordingly, the endpoints may be flexibly selected and configured to allow adequate transport and utilization of the content of the additional media sessions. In particular, the endpoints do not need to support IMS functionalities and do not need to support SIP. In some scenarios, the endpoint of the additional user plane at the first party may be formed by another device than the UE of the first party, and the endpoint of the additional user plane at the second party may be formed by another device than the UE of the second party. As compared to the UE of the party, such other device may offer enhanced media rendering and/or capturing functionalities. For example, such other device could be a smart TV or a multimedia computer. A corresponding exemplary scenario of a packet call between the first party and the second party is illustrated in FIG. 1.

Figure 1:
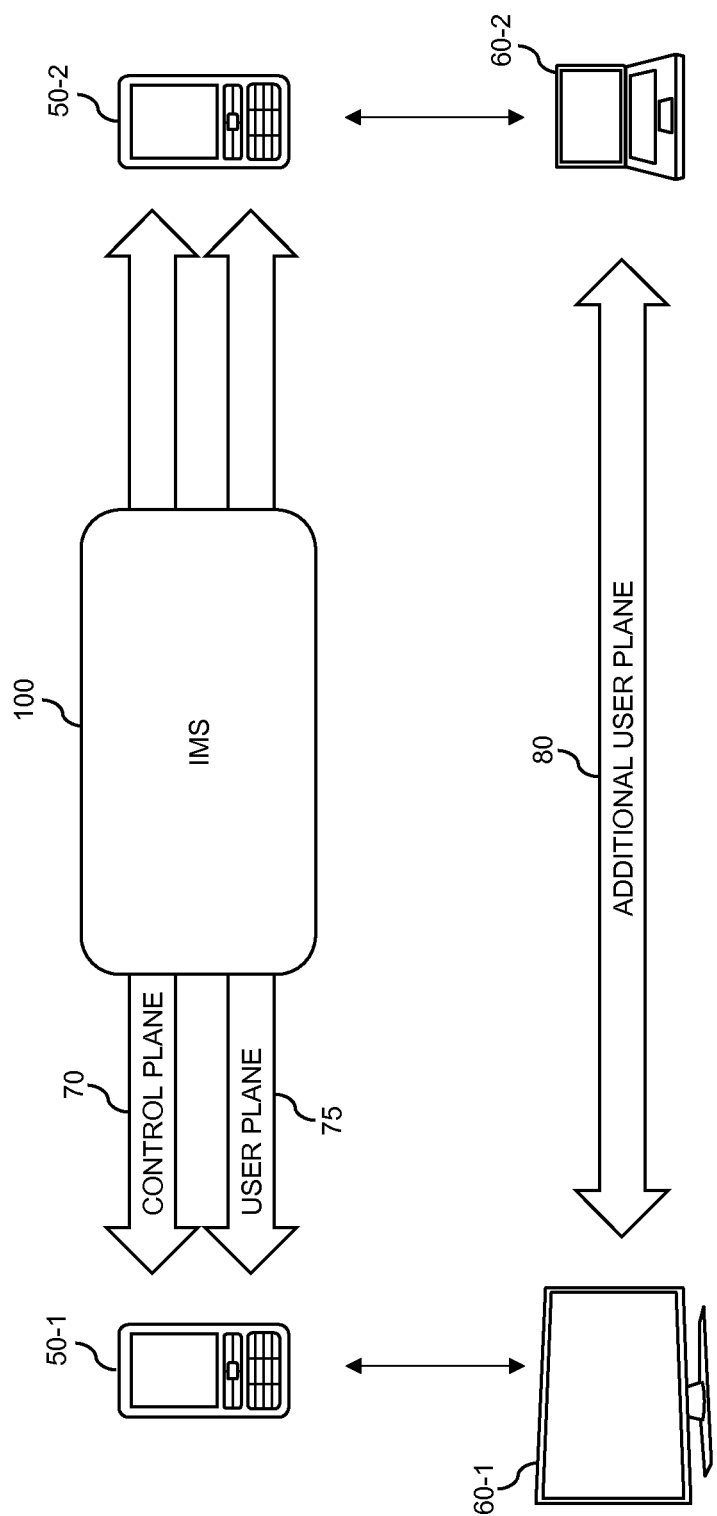
FIG. 1 schematically illustrates an exemplary scenario in which a packet based call is enhanced in accordance with an embodiment of the invention.

FIG. 1 illustrates the UE 50-1 of the first party and the UE 50-2 of the second party. As can be seen, the control plane 70 of the call and the user plane 75 of the call is established through the IMS 100 between the UE 50-1 of the first party and the UE 50-2 of the second party. As will be further explained below, the user plane 75 may be considered as "managed", i.e., subject to management by the IMS 100, and the additional user plane 80 may be considered as unmanaged, i.e., not subject to management by the IMS 100. As further illustrated, the additional user plane 80 is established between an endpoint 60-1 at the first party and an endpoint 60-2 at the second party. These endpoints 60-1, 60-2 are implemented by devices which can be associated with the respective UE 50-1, 50-2 via a functional connection. The functional connection may exist permanently while the user plane 80 is established, or may be established only as required, e.g., when establishing or terminating the additional user plane 80. In the illustrated example, the endpoint 60-1 is a smart TV and the endpoint 60-2 is implemented in a laptop computer. The functional connection to the respective UE 50-1, 50-2 may for example be established via a Bluetooth connection or via a WLAN connection between the endpoint 60-1, 60-2 and the respective UE 50-1, 50-2. The functional connection allows control of the endpoint 60-1, 60-2 by the respective UE 50-1, 50-2. This control may for example be implemented using the gateway control protocol as specified in ITU-T recommendation H.248.1 or using a similar control protocol.

The additional user plane 80 may be carried over a further access technology which is different from the access technology of the communication network which is used for carrying the control plane 70 and the user plane 75 of the call. For example, while the control plane 70 and the user plane 75 may be carried over the LTE radio access technology, the additional user plane 80 may be carried over a wire-based fixed access technology, such as DSL (Digital Subscriber Line), coaxial cable, or optical cable. Because the additional user plane is not managed by the IMS, no specific integration of the further access technology with the mobile network infrastructure is needed.

The device which is used to implement the endpoint 60-1, 60-2 of the additional user plane may advertise its capability of media transfer over the additional user plane 80. For example, such advertising could be implemented by suitable device detection protocols, such as provided by Bluetooth or UPnP (Universal Plug and Play). In response to detecting the device, the UE 50-1, 50-2 may prompt the user to establish the functional connection with the device, e.g., using Bluetooth pairing. The UE 50-1, 50-2 may also automatically establish the functional connection. In some implementations, the UE 50-1, 50-2 may transmit an access code for establishing the functional connection, as for example typically required for Bluetooth pairing.

The additional user plane 80 may be established or modified by the UE 50-1 or by the UE 50-2. For this purpose, the UE 50-1 and the UE 50-2 may exchange information over the control plane 70, using SIP signaling. Such information may in particular include the identity of the endpoints 60-1, 60-2 of the additional user plane 80, e.g., in terms of an IP address and typically also port number(s). The control plane 70 of the call may also be used to indicate transport characteristics, such as protocol type and/or port number. Further, also attributes of media streams or other sessions of the additional user plane 80 may be indicated over the control plane 70. For this purpose, the SDP information for the call may be updated accordingly. In the scenario of FIG. 1, the UE 50-1 may obtain the network identity of the endpoint 60-1 and other information concerning the additional user plane 80 via the functional connection to the endpoint 60-1. Similarly, the UE 50-2 may obtain the network identity of the endpoint 60-2 and other information concerning the additional user plane 80 via the functional connection to the endpoint 60-2. The IMS 100 allows such information concerning the additional user plane 80 to be forwarded through the control plane 70 of the call. Accordingly, the information concerning the additional user plane 80 may be conveyed in an end-to-end manner between the UE 50-1 and the UE 50-2, without alteration by the IMS 100. For this purpose, it may be indicated to the IMS 100 that management of the additional user plane 80 by the IMS 100 is not required. The IMS 100 may then suppress management activity with respect to the additional user plane 80. That is to say, as compared to the user plane 75 of the call, the IMS 100 will not apply specific management actions, such as QoS control or charging, with respect to the additional user plane 80.

An exemplary usage scenario may be as follows: Initially, the UE 50-1 and 50-2 may be engaged in a packet based call, resulting in establishment of the control plane 70 and the user plane 75 for voice communication. Further, the UE 50-1 may be near the device with the endpoint 60-1 and the UE 50-2 may be near the device with the endpoint 60-2. The UE 50-1 and the UE 50-2 may detect the ability of these devices to support establishment of the additional user plane 80 and indicate the possibility to establish the additional user plane 80 to the other call party, e.g., using SIP Re-Invite or Update messages. The IMS 100 allows end-to-end forwarding of such information over the control plane 70. A video stream of the additional user plane 80 may the be added as an additional media session to the SDP information of the call. As compared to the user plane 75, which terminates in the UEs 50-1, 50-2, the additional user plane terminates in the endpoints 60-1, 60-2, which are implemented by other devices. Accordingly, functionalities of these other devices may be used for capturing or rendering the additional media stream. This may offer an improved user experience, e.g., because a larger display size is available for displaying the video stream and/or a camera with higher resolution is available for capturing the video stream.

When the call terminates, the additional user plane 80 may terminate as well. For example, the UE 50-1 may locally instruct the endpoint 60-1 to terminate the additional user plane 80. Similarly, UE 50-2 may locally instruct the endpoint 60-2 to terminate the additional user plane 80.

Figure 2:
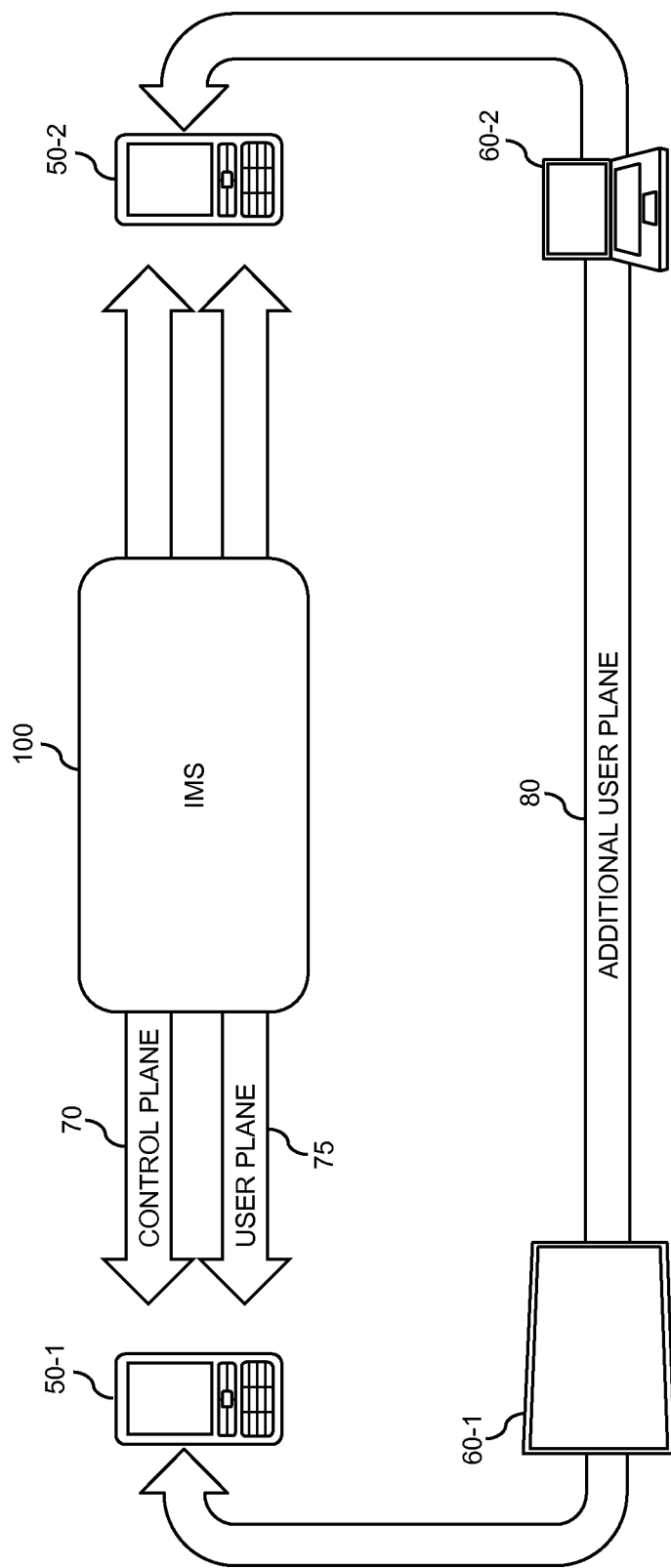
FIG. 2 schematically illustrates a further exemplary scenario in which a packet based call is enhanced in accordance with an embodiment of the invention.

A further exemplary usage scenario may involve using the additional user plane 80 for transferring a certain media item, e.g., a picture or a video clip. For example, the UE 50-1 may wish to transfer such media item to the UE 50-2. The UE 50-1 may then initiate establishment of the additional user plane 80 between the endpoints 60-1 and 60-2 in a similar way as described above. However, in this case the SDP information of the call is updated to indicate 'file transfer' as media type in the additional user plane 80. The UE 50-1 may then transfer the media item to the endpoint 60-2, using the functional connection to the endpoint 60-1, and the data item is then transferred from the endpoint 60-1 to the endpoint 60-2. From the endpoint 60-2, the data item is in turn transferred to the UE 50-2. This may be regarded as an extension of the additional user plane 80 to the UE 50-1 and to the UE 50-2, as illustrated in FIG. 2. The extension of the additional user plane 80 be formed over the functional connection between the UE 50-1 and the endpoint 60-1, and over the functional connection between the UE 50-2 and the endpoint 60-2.

At the UE 50-1, the transfer of the media item may for example be initiated by selecting a corresponding control element. For example, an icon on the UE's 50-1 display may represent the remote party of the call and may indicate that media items may be transferred to the remote party over the additional user plane. When selecting a media item on the UE 50-1, e.g., by browsing through a file system or media gallery implemented on the UE 50-1, a context-dependent menu may offer the transfer of the media item as an option. Selecting this option may in turn cause transfer of the media item over the additional user plane. The option in the context menu may be shown only if the call parties have indicated over the control plane 70 that establishment of an additional user plane 80 is supported for this call. Further, the transfer of the media item could be initiated by dragging the media item to the icon representing the other call party.

Irrespective of using the additional user plane 80 for transfer of a media stream or for transfer of media items, it is not necessary that the device implementing the endpoint 60-1, 60-2 stores or maintains user specific data, e.g., SIP registration information or other user data. Rather, it is sufficient to support the transfer of media streams or media items using parameters as indicated by the respective UE 50-1, 50-2. Accordingly, also a device which is not owned by the user, e.g., a suitably equipped TV in a public or semi-public location such a hotel lobby, may be used for the media transfer over the additional user plane 80.

Figure 3:
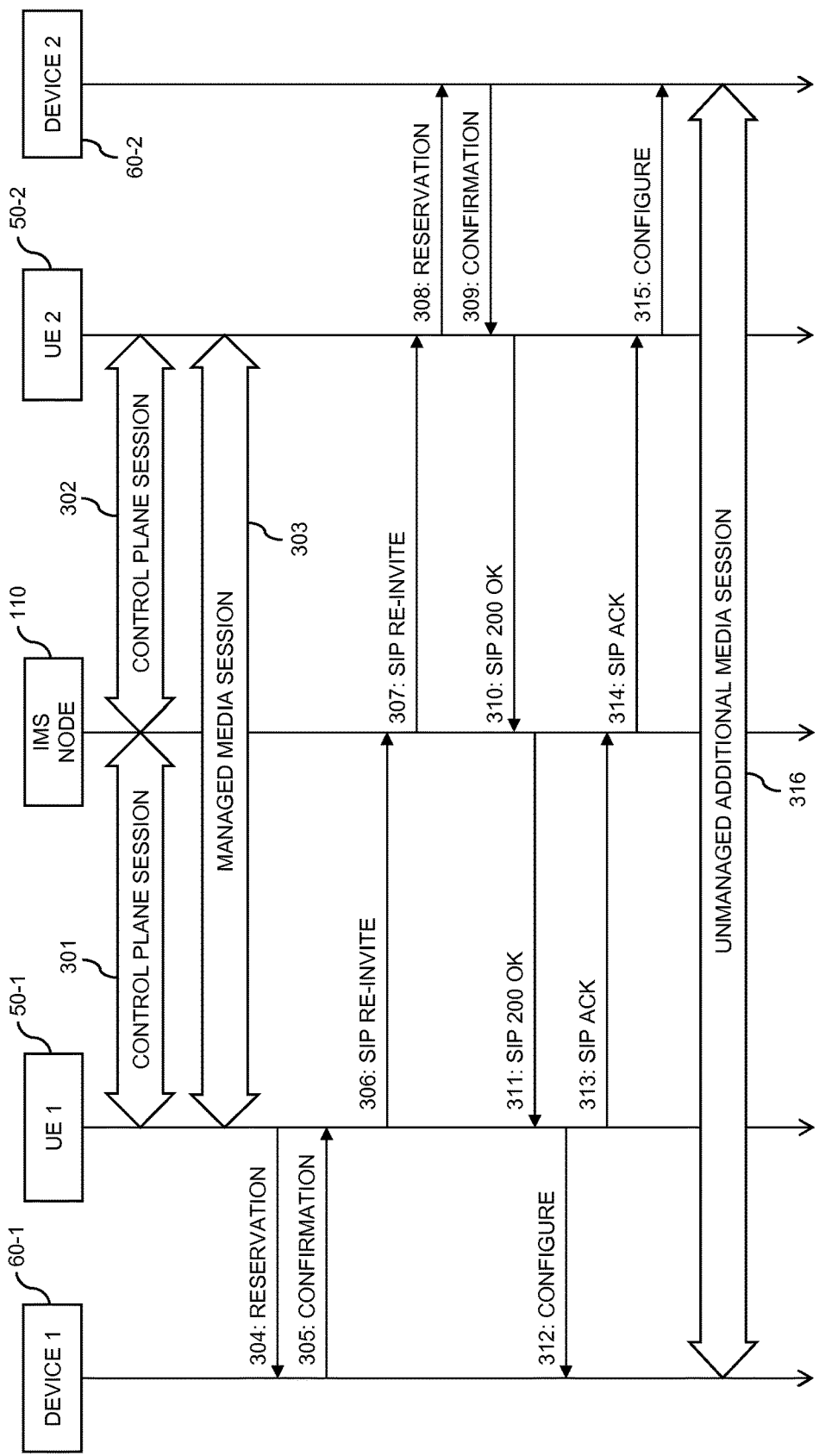
FIG. 3 shows a signaling diagram for illustrating exemplary call control procedures in accordance with an embodiment of the invention.

FIG. 3 shows a signaling diagram which illustrates exemplary procedures for enabling the transfer of media over the additional user plane 80. The procedures of FIG. 3 involve the UE 50-1 of the first party, the UE 50-2 of the second party, the device forming the endpoint 60-1, the device forming the endpoint 60-2, and the IMS, represented by IMS node 110. The IMS node 110 may for example be a Call Session Control Function (CSCF) of the IMS 100. In the procedures of FIG. 3, it is assumed that the establishment of the additional user plane 80 is initiated from the UE 50-1.

In the procedures of FIG. 3, the packet based call between the first party associated with the UE 50-1 and the second party associated with the UE 50-2 is assumed to be already established, e.g., from the UE 50-1 or from the UE 50-2. As illustrated, a control plane session 301 is established between the UE 50-1 and the IMS node 110. Similarly, a further control plane session 302 is established between the UE 50-2 and the IMS node 110. The control plane sessions 301 and 302 are part of the control plane 70 of the call and may be based on known SIP signaling as specified for the IMS. In addition, a managed media session 303 is established between the UE 50-1 and the UE 50-2. The managed media session 303 is part of the user plane 75 and may for example carry a voice stream of the call. The managed media session 303 is subject to management by the IMS, e.g., with the purpose of charging or QoS control. Such management by the IMS may be performed directly by the IMS node 110 or be initiated by the IMS node 110 through further nodes (not illustrated). The control plane sessions 301, 302 and the managed media session 303 may provide basic voice connectivity of the call. Further, it is assumed that the UE 50-1 has already detected the presence of the device 60-1 supporting the media transfer over the additional user plane 80, and that the UE 50-2 has already detected the presence of the device 60-2 supporting the media transfer over the additional user plane 80.

During the call, the user of the UE 50-1 may decide to utilize the possibility of media transfer over the additional user plane, e.g., by selecting a corresponding control element of the UE 50-1. As illustrated, the UE 50-1 may then send a reservation message 304 to the device 60-1. The reservation message 304 has the purpose of indicating to the device 60-1 that the UE 50-1 intends to establish an additional media session over the additional user plane 80, e.g., for the purpose of transferring a video stream. Further, the reservation message 304 may be used to reserve resources for the additional media session. The reservation message 304 may also indicate the type of the additional media session, e.g., video. The device 60-1 responds to the reservation message 304 with a confirmation message 305. The confirmation message 305 indicates information for establishing the additional media session with the device 60-1. In particular, the confirmation message 305 may indicate a network identity of the device 60-1 to be used for the additional media session. The network identity may include the IP address of the device 60-1 and typically also the port number of the transport protocol to be used for the additional media session. The additional media session may for example be based on the Real-time Transmission Protocol (RTP) and be controlled by the Real-time Control Protocol (RTCP). However, depending on the type of the additional media session, other media protocols could be used as well, e.g., the Message Session Relay Protocol (MSRP) for messaging. Also the type of utilized protocol may be indicated in the confirmation message 305.

The UE 50-1 then sends a message 306 to the IMS node 110. Message 306 is a further message of the control plane session 301. The message 306 includes information for updating the SDP information of the call with information concerning the additional media session. This information is based on the information indicated by the device 60-1 in the confirmation message 305. In particular, the information includes the network identity of the device 60-1 and characteristics of the additional media session. Further, the information may also indicate that the management by the IMS 100 is not required for the additional media session. As illustrated, the message 306 may be an SIP Re-Invite message.

As indicated by message 307, the IMS node 110 forwards the information from message 306 to the UE 50-2. In accordance with the information in the message 306, i.e., that no management by the IMS 100 is required for the additional media session, this is accomplished without alteration, so that the information for establishing the additional media session is conveyed in an end-to-end manner from the UE 50-1 to the UE 50-2. Message 307 is a further message of the control plane session 302. Message 307 may be an SIP Re-Invite message.

Having received message 307 with the included information for establishing the additional media session, the UE 50-2 proceeds by sending a reservation message 308 to the device 60-2. The reservation message 308 has the purpose of indicating to the device 60-2 that the UE 50-2 intends to establish the additional media session over the additional user plane 80. In addition, the reservation message 308 may indicate the information for establishing the additional media session as received over messages 306 and 307 from the UE 50-1, e.g., the network identity of the device 60-1 and characteristics of the additional media session. Further, the reservation message 308 may be used to reserve resources for the additional media session. The device 60-2 responds to the reservation message 308 with a confirmation message 309. The confirmation message 309 indicates information for establishing the additional media session with the device 60-2. In particular, the confirmation message 309 may indicate a network identity of the device 60-2 to be used for the additional media session. The network identity may include the IP address of the device 60-2 and typically also the port number of the transport protocol to be used for the additional media session.

The UE 50-2 may now adapt the SDP information of the call according to the information received from the device 60-2 and respond to the message 307 by sending message 310 to the IMS node 110. Message 310 is a further message of the control plane session 302. The message 310 includes information for updating the SDP information of the call with information concerning the additional media session. This information is based on the information indicated by the device 60-2 in the confirmation message 309. In particular, the information includes the network identity of the device 60-2. Further, the information in the message 310 may indicate that no management by the IMS is required for the additional media session. This may in particular be achieved by a corresponding tag or qualifier, as for example explained below in connection with FIG. 4. As illustrated, the message 310 may be an SIP 200 OK message.

As indicated by message 311, the IMS node 110 forwards the information from message 310 to the UE 50-1. In accordance with the information in the message 310, i.e., that no management by the IMS 100 is required for the additional media session, this is accomplished without alteration, so that the information for establishing the additional media session is conveyed in an end-to-end manner from the UE 50-2 to the UE 50-1. Message 311 is an additional message of the control plane session 301. Message 310 may be an SIP 200 OK message.

Having received message 311 with the included information for establishing the additional media session, the UE 50-1 proceeds by sending a configuration 312 to the device 60-1. The configuration message 312 indicates the information for establishing the additional media session as received over messages 310 and 311 from the UE 50-2, e.g., the network identity of the device 60-2. Further, the configuration message 312 may inform the device 60-1 that media transfer over the additional media session can be started.

Further, the UE 50-1 sends message 313 to the IMS node 110. Message 313 acknowledges establishment of the additional media session. Message 313 is a further message of the Message 313 may be an SIP ACK message. As indicated by message 314, the IMS node 110 forwards the acknowledgement from message 313 to the UE 50-2. Message 314 is a further message of the control plane session 302. Message 314 may be an SIP ACK message.

Having received message 314, the UE 50-2 proceeds by sending a configuration message 315 to the device 60-2. The configuration message 315 may inform the device 60-2 that media transfer over the additional media session can be started.

As illustrated by 316, the additional media session is now established between the devices 60-1 and 60-2 and can be used for transfer of media, e.g., reception and/or transmission of video. The additional media session 316 is "unmanaged". That is to say, as compared to the managed media session 303, it is not is subject to management by the IMS 100, as management by the IMS 100 is not required for the additional media session 316.

In the above procedures, it was explained the network identities of the devices 60-1 and 60-2 as exchanged between the parties may include both the IP address and port number. The port number may be useful if remote media stream filtering is applied for the additional media session 316, i.e., media reception is allowed only from a certain IP address and port number. However, in some implementations it may also sufficient to indicate the network identity in terms of only the IP address. Further, also other types of network identity could be used.

An example of SDP information, as for example updated by message 306 of the procedures of FIG. 3, is illustrated in FIG. 4. The semantics and syntax of the SDP information may generally be in accordance with the specifications of IETF RFC 4566. As can be seen, the SDP information includes an additional section for description of the additional media session 316. In the example of FIG. 4, the beginning of this section is marked by the line "Unmanaged media stream".

The description in the additional section contains an item "Connection Information (c)" to indicate the IP connection information to be used for the additional media session 316 (which is different from the IP connection used for the managed media session). In the illustrated example, the fact that the additional media session 316 is unmanaged is explicitly indicated by a qualifier "/unmanaged" at the end of the item "Connection Information". Alternatively, other forms of such qualifier could be used. Still further, the fact that the additional media session 316 is unmanaged could also be indicated by a further Media Attribute item in the SDP information. The qualifier or Media Attribute item indicates to the IMS node 110 that no management of the additional media session by the IMS 100 is required. In response to detecting this indication, the IMS node 110 refrains from initiating management actions with respect to the additional media session 316, such as charging or QoS control. Further, the IMS node 110 will refrain from altering certain information in SIP messages originating from the UE 50-1 and destined to the UE 50-2 and in SIP messages originating from the UE 50-2 and destined to the UE 50-1.

In this way, end-to-end information exchange concerning the additional media session 316 may be enabled by the IMS node 110. Other IMS nodes may react in a similar way to the indication.

The additional media session 316 as for example established in the procedure of FIG. 3 may be terminated in response to various conditions. For example, termination of the control sessions 301, 302 and of the managed media session 303 may cause the UE 50-1 and the UE 50-2 to instruct the devices 60-1 and 60-2 to terminate the additional media session 316. Further, the user of the UE 50-1 or of the UE 50-2 may decide to terminate the additional media session 316 by selecting a corresponding control element on the UE 50-1, 50-2, which causes the UE 50-1 or the UE 50-2 to instruct the corresponding device 60-1, 60-2 to terminate the additional media session 316. The other call party may be informed of such action via the control plane sessions 301, 302 of the call.

Further, termination of the additional media session 316 may be caused by a loss of the functional connection between the UE 50-1 and the device 60-1 or a loss of the functional connection between the UE 50-2 and the device 60-2. Imminent loss of the functional connection may be detected by the UE 50-1, 50-2 which may then instruct the respective device 60-1, 60-2 to terminate the additional media session 316 and inform the other call party via the control plane sessions 301, 302 of the call. Loss of the functional connection may also be detected by the device 60-1, 60-2 and, in response to such detection, terminate the additional media session (unless having already been instructed to do so by the respective UE 50-1, 50-2).

Further, the functional connection between the device 60-1, 60-2 and the respective UE 50-1, 50-2 may support transmission of regular "heartbeat" messages, which indicate proper operation of the UE 50-1, 50-2 to the respective device 60-1, 60-2. Lack of reception of such heartbeat messages may indicate to the device 50-1, 50-2 that the respective UE 50-1, 50-2 has ceased to operate as expected, which may cause the device 60-1, 60-2 to terminate the additional media session 316. Such condition could be detected by the respective UE 50-1, 50-2 over the functional connection and be indicated to the other call party over the control plane sessions 301, 302 of the call.

Still further, termination of the additional media session 316 may be caused by a change of the operation mode of the device 60-1, 60-2. For example, the functionality of supporting the additional user plane 80 may be de-activated in the device 60-1, 60-2. Such condition could be detected by the respective UE 50-1, 50-2 over the functional connection and be indicated to the other call party over the control plane sessions 301, 302 of the call.

As mentioned above, various types of devices 60-1, 60-2 may be used as the endpoint of the additional media session, e.g., a smart TV such as the device 60-1 or a laptop computer such as the device 60-2. In more general, devices may be used which are equipped with IP connectivity and which provide some media rendering and/or capturing functionality. Functionalities of such devices will be further explained in the following.

FIG. 5 further illustrates a possible configuration of the device 60-1, which corresponds to a smart TV. The device 60-1 provides IP connectivity through network connection 62. Further, the device 60-1 is equipped with a display 64 to provide media rendering functionality. Due to a display size which is significantly larger than in typical UEs, the device 60-1 may provide a better user experience when it is used for rendering video content of a multimedia enhanced call. Still further, the device 60-1 provides media capturing functionality through a camera 68.

As further illustrated, the display 64 of the device 60-1 may be organized in multiple windows, e.g., using Picture in Picture (PIP) technology. Accordingly, a dedicated portion 66 of the display could be used for rendering the video content of the multimedia enhanced call.

To support the functional connection with the UE 50-1, the device 60-1 is provided with a corresponding interface 69. As mentioned above, this interface may be implemented using Bluetooth technology or WLAN technology.

When using Bluetooth technology for implementing the functional connection, the device 60-1 may be configured to broadcast its Bluetooth identity. The Bluetooth identity may reveal that it belongs to a device that supports media transfer over the additional user plane 80. Upon detecting the Bluetooth identity and the support for media transfer over the additional user plane, the UE 50-1 may provide a corresponding indication to the user, e.g., through an icon on the display of the UE 50-1. Alternatively, the Bluetooth identity of the device 60-1 may be advertised in some other way, e.g., through a visible indication on the device itself, and the user may manually configure the Bluetooth connection between the UE 50-1 and the device 60-1, using the indicated information.

When using WLAN technology for implementing the functional connection, the device 60-1 may be configured to broadcast its WLAN Access Point (AP) name. The UE 50-1 may then detect the broadcasted WLAN AP name and connect to the same AP. The UE 50-1 may then communicate with the device 60-1 over the WLAN and detect the ability of the device 60-1 to support media transfer over the additional user plane 80. For example, the device 60-1 may use UPnP to advertise this capability in the WLAN.

The capability of the device 60-1 to support media transfer over the additional user plane 80 may also be advertised by an optical code which can be identified by the UE 50-1 by analyzing an image captured by a built-camera of the UE 50-1. For example, such optical code could be in the form of a Quick Response (QR) code or of a bar code. The optical code may for example be arranged at a visible location of the device's 60-1 housing or may be shown on the display 62, e.g., as an overlay. Having identified the optical code, the UE 50-1 may display an indication of the possibility of media transfer over the additional user plane 80 to the user. The UE 50-1 may use information from the optical code to automatically establish the functional connection to the device 60-1. The optical code may be used in connection with the functional connection being established using Bluetooth technology or in connection with the functional connection being established using WLAN technology.

In some implementations, the user of the UE 50-1 may need to enter an access code for establishing the functional connection. Depending on the technology used for implementing the functional connection, this access code may be a passcode for Bluetooth pairing or a WLAN key. The access code may for example be shown on the housing or display of the device 60-1 or may be available in some other form.

When the functional connection is successfully established, the UE 50-1 may indicate to the user that the functionality of media transfer over the additional user plane 80 is available, e.g., by a change of color of the corresponding icon on the display of the UE 50-1.

Figure 6:
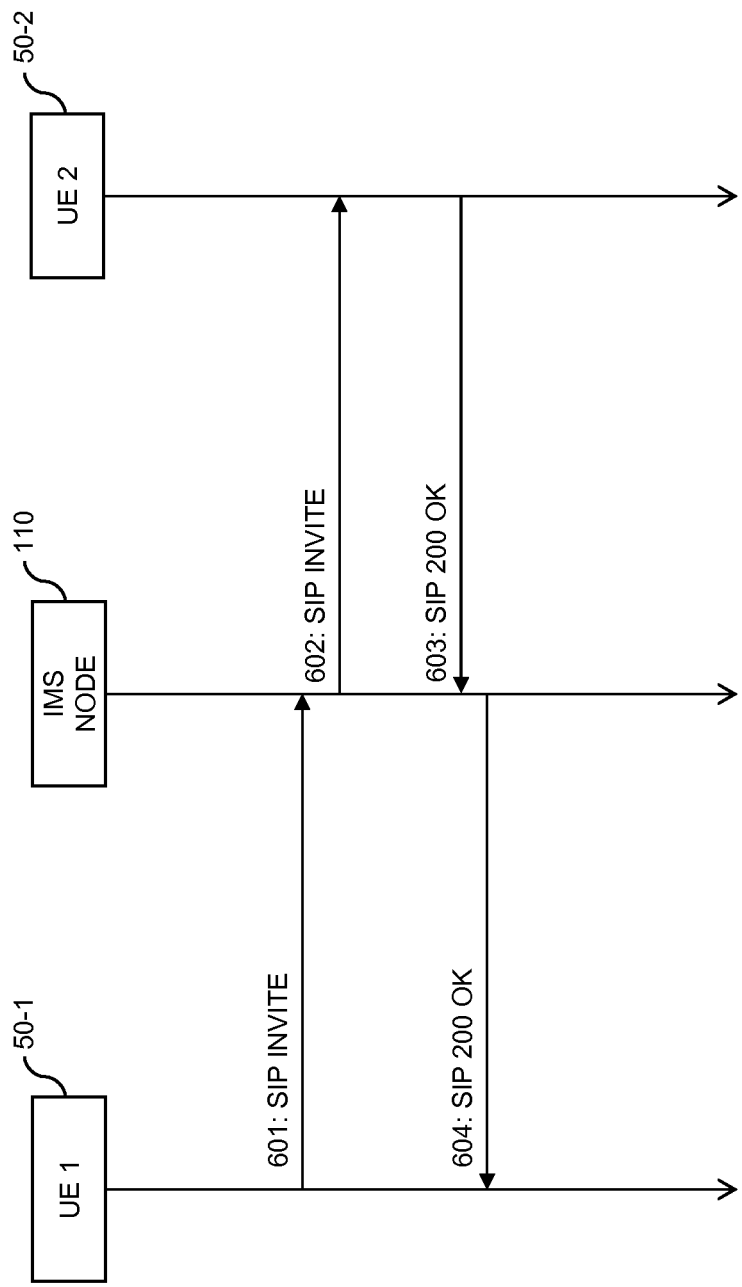
FIG. 6 shows a signaling diagram for illustrating exemplary call establishment procedures in accordance with an embodiment of the invention.

When now establishing a packet based call through the IMS 100, the UE 50-1 may signal the support of media transfer over the additional user plane 80 to the other call party. An example of corresponding procedures is illustrated in FIG. 6. The procedures of FIG. 6 involve the UE 50-1, the UE 50-2, and the IMS node 110. The procedures of FIG. 6 may for example be used before the procedures of FIG. 3, when establishing the control plane sessions 301, 302, and the managed media session 303.

In the illustrated example, the UE 50-1 initiates the call by sending message 601 to the IMS node 110. As illustrated, message 601 may be an SIP Invite message. Message 601 requests establishment of the call with the other call party, i.e., with the UE 50-2. Message 601 further indicates that the UE 50-1 supports the functionality of media transfer over the additional user plane 80 for this call, e.g., by including a corresponding tag in the "Supported" header of the SIP Invite message.

As indicated by message 602, the IMS node 110 proceeds with the establishment of the call by sending message 602 to the UE 50-2. Also message 602 may be an SIP Invite message. In message 602, the IMS node 110 forwards the information concerning the support of the functionality of media transfer over the additional user plane for this call by the UE 50-1. This may be accomplished without alteration, i.e., the information is conveyed in an end-to-end manner from the UE 50-1 to the UE 50-2.

The UE 50-2 responds to the message 602 by sending message 603 to the IMS node 110. Message 603 may be an SIP 200 OK message indicating that the UE 50-2 accepts establishment of the call. In message 603, the UE 50-2 may indicate whether it supports the functionality of media transfer over the additional user plane 80 for this call, e.g., by including a corresponding tag in the "Supported" header of the SIP 200 OK message.

The IMS node 110 proceeds with the establishment of the call by sending message 604 to the UE 50-1. Also message 604 may be an SIP 200 OK message. In message 604, the IMS node 110 forwards the information concerning the support of the functionality of media transfer over the additional user plane for this call by the UE 50-2. This is accomplished without alteration, i.e., the information is conveyed in an end-to-end manner from the UE 50-2 to the UE 50-1.

If the UE 50-2 has already successfully established the functional connection with a device supporting the media transfer over the additional user plane 80, the UE 50-2 may directly indicate the support in message 603, which information is then forwarded to the UE 50-1. Further, the UE 50-2 may attempt to establish the functional connection in response to receiving the message 602, and indicate the support if the functional connection was successfully established. Alternatively, the UE 50-2 may wait with such attempt until transfer of media over the additional user plane is requested by the UE 50-1.

Once the call is successfully established, the UE 50-1 and/or 50-2 may provide an indication that the transfer of media over the additional media session 80 is supported. This indication may vary depending on whether the support was indicated by both call parties, or only by one call party.

Figure 7:
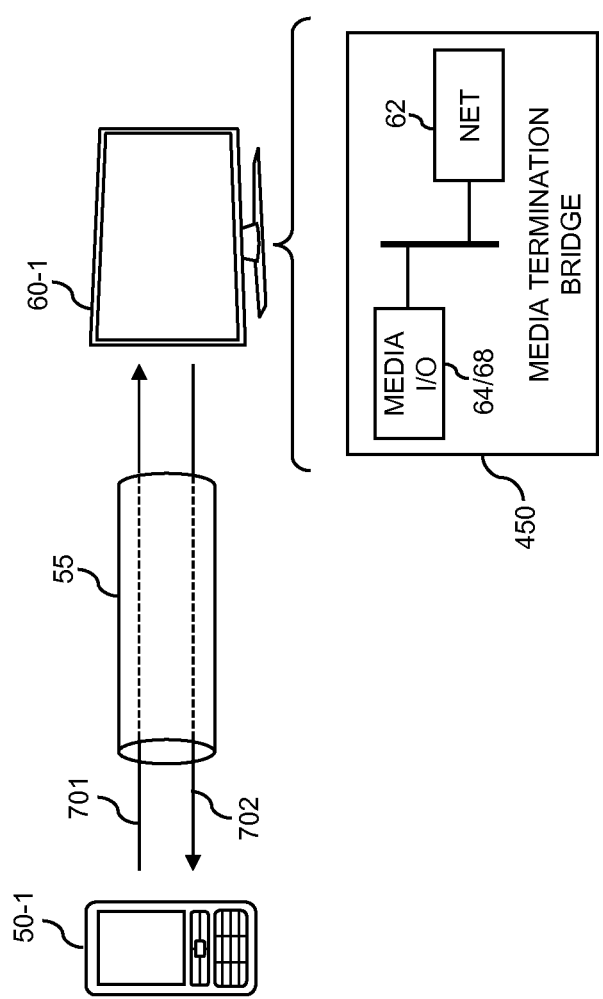
FIG. 7 shows exemplary procedures in accordance with an embodiment of the invention, which may be used for controlling an external media rendering and/or capturing device.

Exemplary procedures which can be used by a UE to gain control over the capability of another device to transfer media over an additional user plane will now be further explained with reference to FIG. 7. The procedures of FIG. 7 involve the UE 50-1 and the device 60-1. However, it is to be understood that similar procedures could also be applied for the UE 50-2 and the device 60-2. Further, FIG. 7 also illustrates the functional connection 55 between the UE 50-1 and the device 60-1. As mentioned above, the functional connection 55 may be implemented using Bluetooth technology or WLAN technology (or other wireless or wired connection technologies). In the procedures of FIG. 7, it is assumed that the functional connection 55 is already established, e.g., using procedures as explained above, that the UE 50-1 has detected the capability of the device 60-1 to support the transfer of media over the additional user plane 80, and that a call with another party, e.g., the UE 50-2 has been established.

If the user of the UE 50-1 now selects the option of the media transfer over the additional user plane 80, the UE 50-1 sends reservation message 701 to the device 60-1.

The reservation message 701 indicates to the device 60-1 that the UE 50-1 intends to use the capability of media transfer over the additional user plane 80. Further, the reservation message 701 may also indicate further information on the intended media transfer, e.g., type of media, such as video, messaging, or file transfer.

The reservation message 701 is sent to the device 60-1 to reserve and configure resources for terminating a media session over the additional user plane. This may involve configuring a media termination bridge 450 in the device 60-1. As illustrated, the media termination bridge 450 provides a connection between the required media rendering and/or capturing functionalities (media I/O) of the device 60-1 and the network connection 62 of the device 60-1. The media termination bridge 450 may be implemented as a software process running on a processor of the device 60-1.

Further, the reservation message 701 may cause the device 60-1 to perform preparations for media reception and rendering and/or for media capturing and transmission. This may for example involve activation of the display 64 or of the camera 68 as illustrated in FIG. 5. Further, this may involve allocation of a network identity, e.g., defined in terms of an IP address and typically also port number, of the device 60-1 to be used for the media transfer. This network identity may also be referred to as a media termination address. As mentioned above, this network identity may include the IP address of the device 60-1 and typically also one or more port numbers of the utilized media protocol, e.g., a port number for RTP and a further port number for RTCP.

The device 60-1 then responds to the reservation message 701 by sending confirmation message 702 to the UE 50-1. The confirmation message 702 confirms to the UE 50-1 that it may use the capability of media transfer over the additional media session 80. Further, the confirmation message 702 may indicate information for establishment of the media session, e.g., codec information (e.g., H.263) or related information for constructing an SDP offer. Still further, the confirmation message may indicate the network identity of the device 60-1 to be used for the media session, e.g., the allocated IP address and port number(s).

Using the procedures, the UE 50-1 may acquire the necessary information to be conveyed to the UE 50-2 so as to allow establishment of the media session over the additional user plane 80. Similar procedures may be used by the UE 50-2 to acquire the necessary information to be conveyed to the UE 50-1 so as to allow establishment of the media session over the additional user plane 80. Procedures as illustrated in FIG. 7 may be used by the UE 50-1 in connection with the reservation message 304 and the confirmation message 305 of FIG. 3. Further, similar procedures may be used by the UE 50-2 to acquire the necessary information to be conveyed to the UE 50-1 so as to allow establishment of the media session over the additional user plane 80, i.e., in connection with the reservation message 308 and the confirmation message 309 of FIG. 3. In the latter case, the reservation message 308 may additionally be used for conveying the information for establishment of the media session to the device 60-2, because such information is already available at the UE 50-2.

Figure 8:
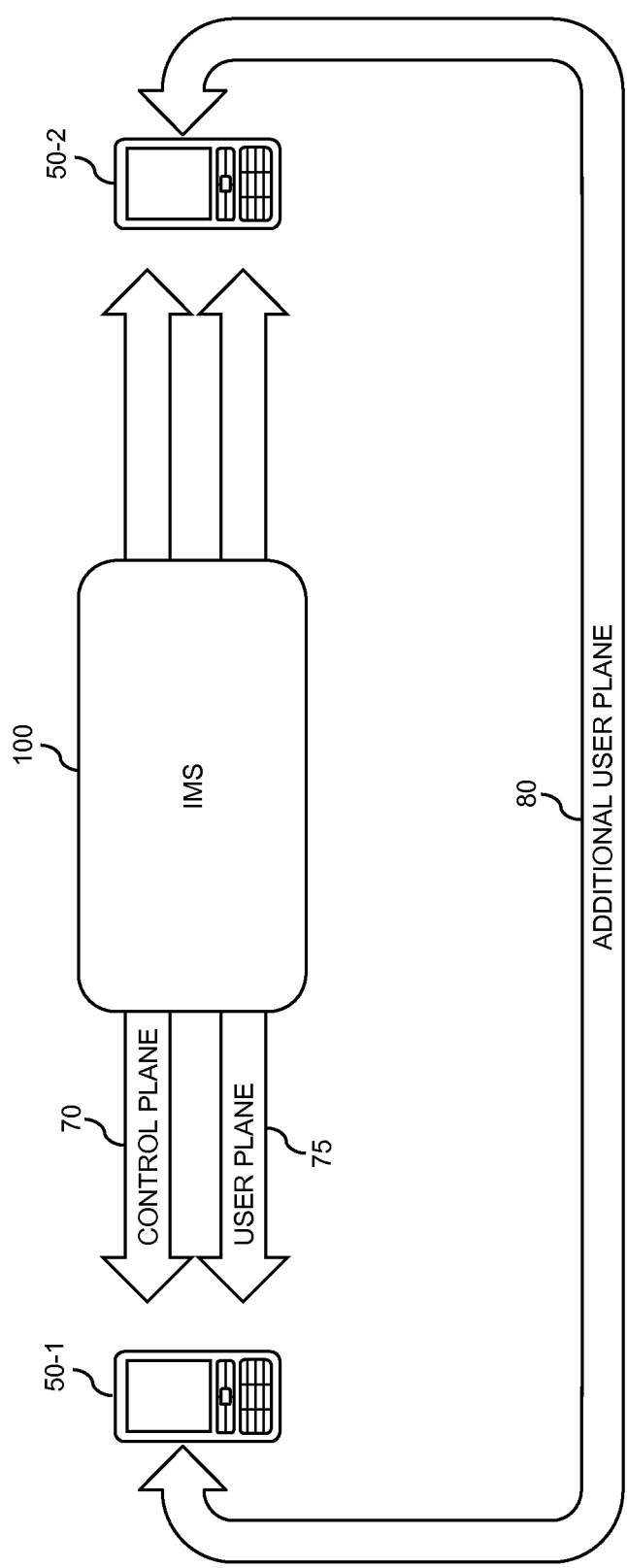
FIG. 8 schematically illustrates a further exemplary scenario in which a packet based call is enhanced in accordance with an embodiment of the invention.

In the above, the transfer of media over the additional user plane was described with reference to examples in which the additional user plane 80 is established over additional devices. However, it is also possible that the additional user plane is established directly from at least one of the UEs 50-1, 50-2 engaged in the call. A corresponding scenario in which the additional user plane 80 is established directly between the UE 50-1 and the UE 50-2 is illustrated in FIG. 8. For example, while the control plane 70 and the user plane 75 of the call are established over the mobile network and the IMS 100, the additional user plane 80 may be established over WLAN connectivity of the UE 50-1 and the UE 50-2. Each UE 50-1, 50-2 may then use different network identities, in particular IP addresses, for the IP connectivity over the mobile network and for the IP connectivity over WLAN. The network identity for IP connectivity over WLAN could then be used for the establishment of the media session over the additional user plane 80, using similar procedures as explained above, however without negotiation of capabilities or resource reservation with external devices. Of course, it would also be possible that the one endpoint of the additional user plane 80 is located in a UE, while the other endpoint is located in an external device associated with a UE.

Establishing the additional user plane directly from a UE may for example facilitate transfer of a selected media item from this UE, similar to the scenario of FIG. 2.

Figure 9:
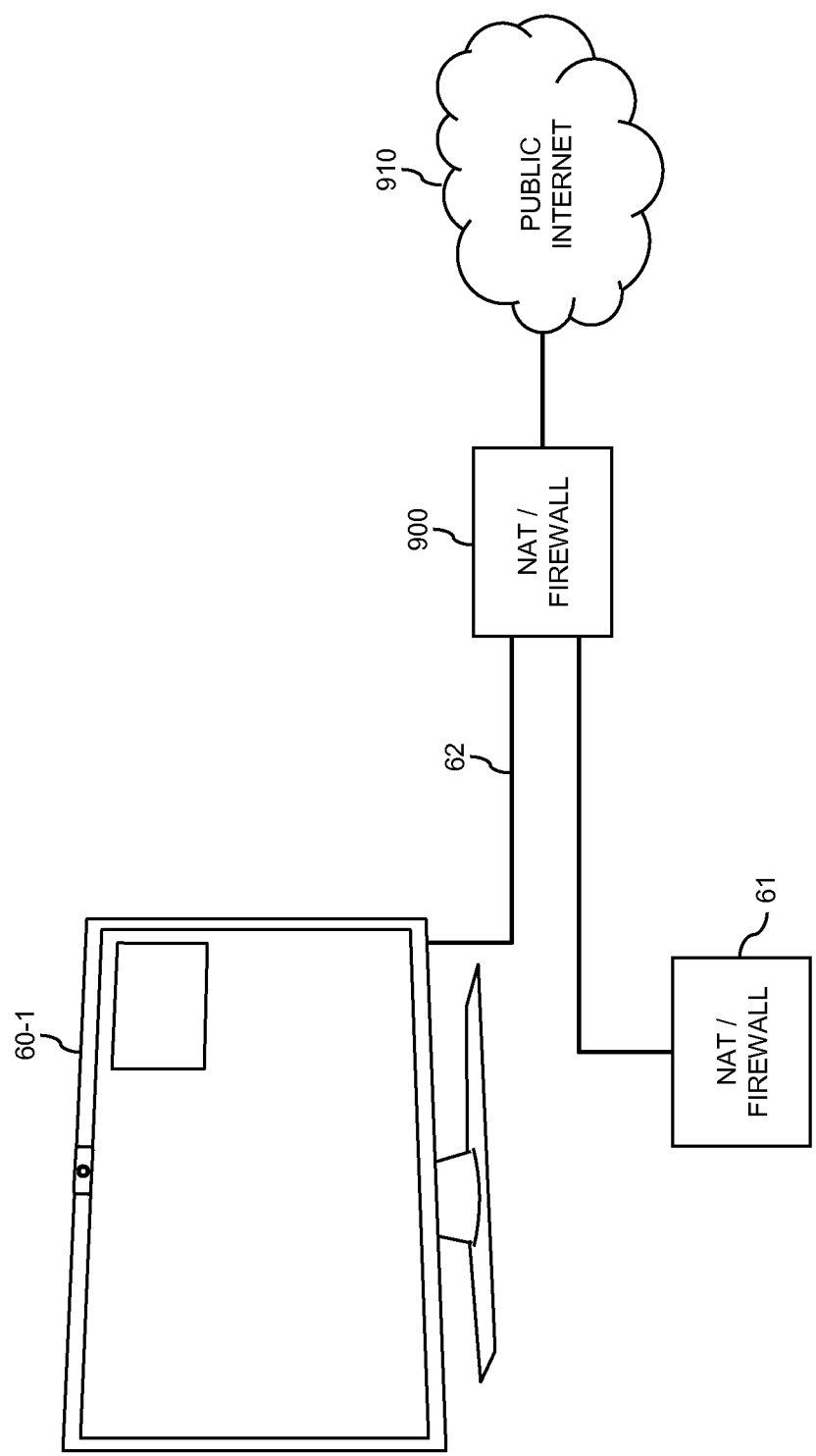
FIG. 9 schematically illustrates a scenario in which an endpoint of the additional media session uses a private network address and/or is separated by a firewall from the public internet.

In some scenarios, the IP connectivity used for the additional user plane 80 may be based on a private IP address and/or the endpoint of the additional user plane 80 may be separated from the public internet by a firewall. A corresponding scenario is illustrated in FIG. 9. In the exemplary scenario of FIG. 9, the network connection 62 of the device 60-1 is connected via a Network Address Translation (NAT) and firewall node 900 to the public Internet 910.

In such scenarios, the endpoint of the additional user plane 80, in the illustrated scenario the device 60-1, may need some control over the NAT/firewall node 900. For example, the endpoint may need to obtain the IP address and port number assigned to its traffic on the public side of the NAT/firewall node 900. Further, the endpoint may use such control to define a mapping between its private IP address and port number used for the media transfer over the additional user plane 80 and the public IP address and port number used on the public side of the NAT/firewall node 900.

The required control of the NAT/firewall node 900 may for example be obtained through a UPnP functionality of the NAT/firewall node 900. A method like Universal plug and Play (UPnP) can be used for this purpose. UPnP allows the TV set to have control over the NAT and to apply the above-described settings in the NAT.

In some scenarios, the user of the UE 50-1 and/or the user of the UE 50-2 may be provided with further control possibilities over the additional user plane 80. For example, such control may involve suspending of the transmission of media content or resuming the transmission of the media content. Further, such control may act on parameters for rendering the media content, e.g., to increase or reduce the size of the display window 66 for displaying video content.

Figure 10:
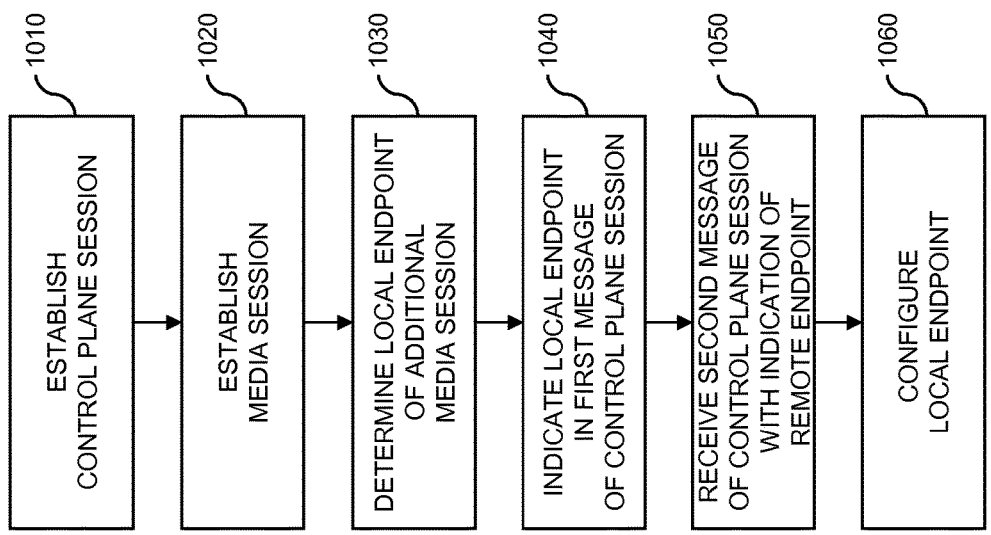
FIG. 10 shows a flowchart for illustrating a UE based method in accordance with an embodiment of the invention.

FIG. 10 shows a flowchart for illustrating a method which may be used to implement the above concepts of controlling a packet based call in a UE, e.g., in the UE 50-1 or 50-2. The method is described from the perspective of a local party of the call which is associated with the UE, while the other call party is referred to as remote party. The remote party may be associated with a further UE.

At step 1010, the UE establishes a control plane session of the call with an IP multimedia system, which may in particular be implemented by the IMS, e.g., an MMTel service of the IMS. The establishment of the control plane session may be initiated by the UE or from the IP multimedia system. The control session may for example correspond to one of the control sessions 301, 302 of FIG. 3.

At step 1020, the UE establishes a media session of the call. The media session is managed by the IP multimedia system. The media session may be established between the UE associated with the local party and a further UE, which is associated with the remote party. This management may for example involve controlling the process of establishing, maintaining, and/or terminating the media session. Further, this management may involve charging or QoS control of the media session. The media session may for example correspond to the media session 303 of FIG. 3.

At step 1030, the UE determines a local endpoint for terminating an additional media session at the local party. The local endpoint may be implemented by a media rendering and/or capturing device, such as the device 60-1 or 60-2. Alternatively, the local endpoint may be implemented in the UE, e.g., as illustrated in FIG. 8. The additional media session may for example correspond to the media session 316 of FIG. 3.

At step 1040, the UE sends a first message of the control plane session to the IP multimedia system. The first message indicates the local endpoint, e.g., in terms of a network identity of the local endpoint. The network identity may for example be defined by an IP address and optionally also a port number. Further, the first message indicates that management of the additional media session by the IP multimedia system is not required. Such indication may for example be provided by a corresponding qualifier, tag, or attribute in the message, e.g., as explained in connection with FIG. 4. This indication may cause the IP multimedia system to suppress specific management activities with respect to the additional media session. Accordingly, the additional media session may also be referred to as unmanaged media session. If the UE is at the call party which initiates establishment of the additional media session, such as the UE 50-1 in the procedures of FIG. 3, the first message may correspond to the message 306 of FIG. 3. If the UE is at the other call party, such as the UE 50-2 in the procedures of FIG. 3, the first message may correspond to the message 310 of FIG. 3.

At step 1050, the UE receives a second message of the control plane session from the IP multimedia system. The second message indicates a remote endpoint for terminating the additional media session at the remote party, e.g., in terms of a network identity of the remote endpoint. The network identity may for example be defined by an IP address and optionally also a port number. If the UE is at the call party which initiates establishment of the additional media session, such as the UE 50-1 in the procedures of FIG. 3, the second message may correspond to the message 311 of FIG. 3. If the UE is at the other call party, such as the UE 50-2 in the procedures of FIG. 3, the second message may correspond to the message 307 of FIG. 3. As can be seen from the latter example, the second message may also be transmitted before the first message. Accordingly, the terms "first message" and "second message" are not intended to indicate a specific order.

At step 1060, the UE configures the local endpoint for transfer of media with the remote endpoint as indicated in the second message received at step 1050. Examples of such configuration procedures are messages 304 and 312 of FIG. 3 or by message 308 and 315 of FIG. 3.

The control plane session and the media session of the call may be are associated with a first network identity of the UE, e.g., the IP address assigned to the UE for IP connectivity via a mobile network. The local endpoint for terminating the additional media session may be associated with a second network identity which is different from the first network identity, e.g., with an IP address assigned for IP connectivity over another access technology such as WLAN. Similarly, the media session of step 1020 may be established via a first access technology, while the additional media session is established via a second access technology which is different from the first access technology. For example, the first access technology may be a cellular radio access technology of a mobile network providing the IP multimedia system, and the second access technology may be based on WLAN, DSL, coaxial cable, or optical cable.

The configuration of the local endpoint may further involve that UE indicates information for establishment of the additional media session to the local endpoint. This information may in particular include the network identity of the remote endpoint. The configuration of the local endpoint may also involve that the UE reserves resources for the additional media session at the local endpoint. If the local endpoint is implemented by another device than the UE, e.g., by a media rendering and/or capturing device connected to the UE, the configuration of the local endpoint may further involve that UE indicates the information for establishment of the additional media session to the other device. The configuration of the local endpoint may then also involve that the UE reserves resources for the additional media session at the other device, e.g., as explained in connection with FIG. 7.

The UE may also receive information for establishment of the additional media session from the local endpoint. This information may in particular include the network identity of the local endpoint. If the local endpoint is implemented by another device than the UE, e.g., by a media rendering and/or capturing device connected to the UE, the UE may also receive information for establishment of the additional media session from the other device, such as explained in connection with FIG. 7. Depending on the received information, the UE may generate the first message of the control plane session as sent in step 1040.

Figure 11:
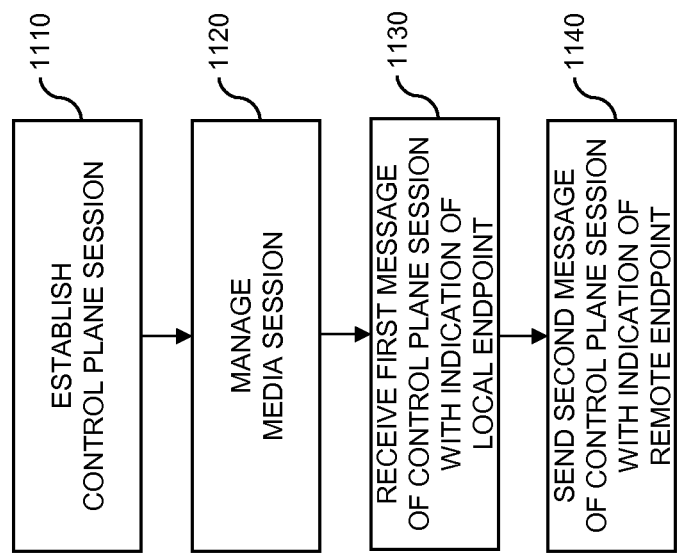
FIG. 11 shows a flowchart for illustrating a network based method in accordance with an embodiment of the invention.

FIG. 11 shows a flowchart for illustrating a method which may be used to implement the above concepts of controlling a packet based call in a node of an IP multimedia system, e.g., in the IMS node 110. As mentioned above, the IP multimedia system may in particular be implemented by the IMS. For example, the node 110 may correspond to a CSCF node or an SIP application server of the IMS. The method is described from the perspective of interaction of the IMS node 110 with a UE associated with a local party of the call, while the other call party is referred to as remote party. The remote party may be associated with a further UE.

At step 1110, the node establishes a control plane session of the call with the UE at the local party. The establishment of the control plane session may be initiated by the node or by the UE. The control session may for example correspond to one of the control sessions 301, 302 of FIG. 3.

At step 1120, the node manages a media session of the call. This management may for example involve controlling the process of establishing, maintaining, and/or terminating the media session. Further, this management may involve charging or QoS control of the media session. The media session may for example correspond to the media session 303 of FIG. 3.

At step 1130, the node receives a first message of the control plane session from the UE. The first message indicates a local endpoint of the additional media session, e.g., in terms of a network identity of the local endpoint. The network identity may for example be defined by an IP address and optionally also a port number. The local endpoint may be implemented by a media rendering and/or capturing device, such as the device 60-1 or 60-2. Alternatively, the local endpoint may be implemented in the UE, e.g., as illustrated in FIG. 8. The additional media session may for example correspond to the media session 316 of FIG. 3. The node may forward received information concerning the local endpoint in an end-to-end manner to the remote party.

Further, the first message received at step 1130 indicates that management of the additional media session by the IP multimedia system is not required. Such indication may for example be provided by a corresponding qualifier, tag, or attribute in the message, e.g., as explained in connection with FIG. 4. This indication may cause IP multimedia system to suppress specific management activities with respect to the additional media session. Accordingly, the additional media session may also be referred to as unmanaged media session. If the UE is at the call party which initiates establishment of the additional media session, such as the UE 50-1 in the procedures of FIG. 3, the first message may correspond to the message 306 of FIG. 3. If the UE is at the other call party, such as the UE 50-2 in the procedures of FIG. 3, the first message may correspond to the message 310 of FIG. 3.

At step 1140, the node sends a second message of the control plane session to the UE. The second message indicates a remote endpoint for terminating the additional media session at the remote party, e.g., in terms of a network identity of the remote endpoint. The network identity may for example be defined by an IP address and optionally also a port number. If the UE is at the call party which initiates establishment of the additional media session, such as the UE 50-1 in the procedures of FIG. 3, the second message may correspond to the message 311 of FIG. 3. If the UE is at the other call party, such as the UE 50-2 in the procedures of FIG. 3, the second message may correspond to the message 307 of FIG. 3. As can be seen from the latter example, the second message may also be transmitted before the first message. Accordingly, the terms "first message" and "second message" are not intended to indicate a specific order.

The node may determine the remote endpoint from a message of a further control plane session of the call, which is established with the remote party, in particular with a further UE associated with the remote party. For example, in the scenario where the IMS node 110 sends the second message 311 to the UE 50-1, the remote endpoint may have been determined from the information in the message 310 from the UE 50-2. Similarly, in the scenario where the IMS node 110 sends the second message 307 to the UE 50-2, the remote endpoint may have been determined from the information in the message 306 from the UE 50-1. The node may forward received information concerning the remote endpoint in an end-to-end manner to the UE associated with the local party.

The control plane session and the media session of the call may be associated with a first network identity of the UE, e.g., the IP address assigned to the UE for IP connectivity via a mobile network. The local endpoint for terminating the additional media session may be associated with a second network identity which is different from the first network identity, e.g., with an IP address assigned for IP connectivity over another access technology such as WLAN. Similarly, the media session of step 1120 may be established via a first access technology, while the additional media session is established via a second access technology which is different from the first access technology. For example, the first access technology may be a cellular radio access technology of a mobile network providing the IP multimedia system, and the second access technology may be based on WLAN, DSL, coaxial cable, or optical cable.

It is to be understood that the methods of FIGS. 10 and 11 may be combined in a system which includes the UE and the node of the IP multimedia system. In such cases, the UE could use the method of FIG. 10 to send the first message to the node and to receive the second message from the node, and the node could use the method of FIG. 11 to receive the first message from the UE and to send the second message to the UE.

Figure 12:
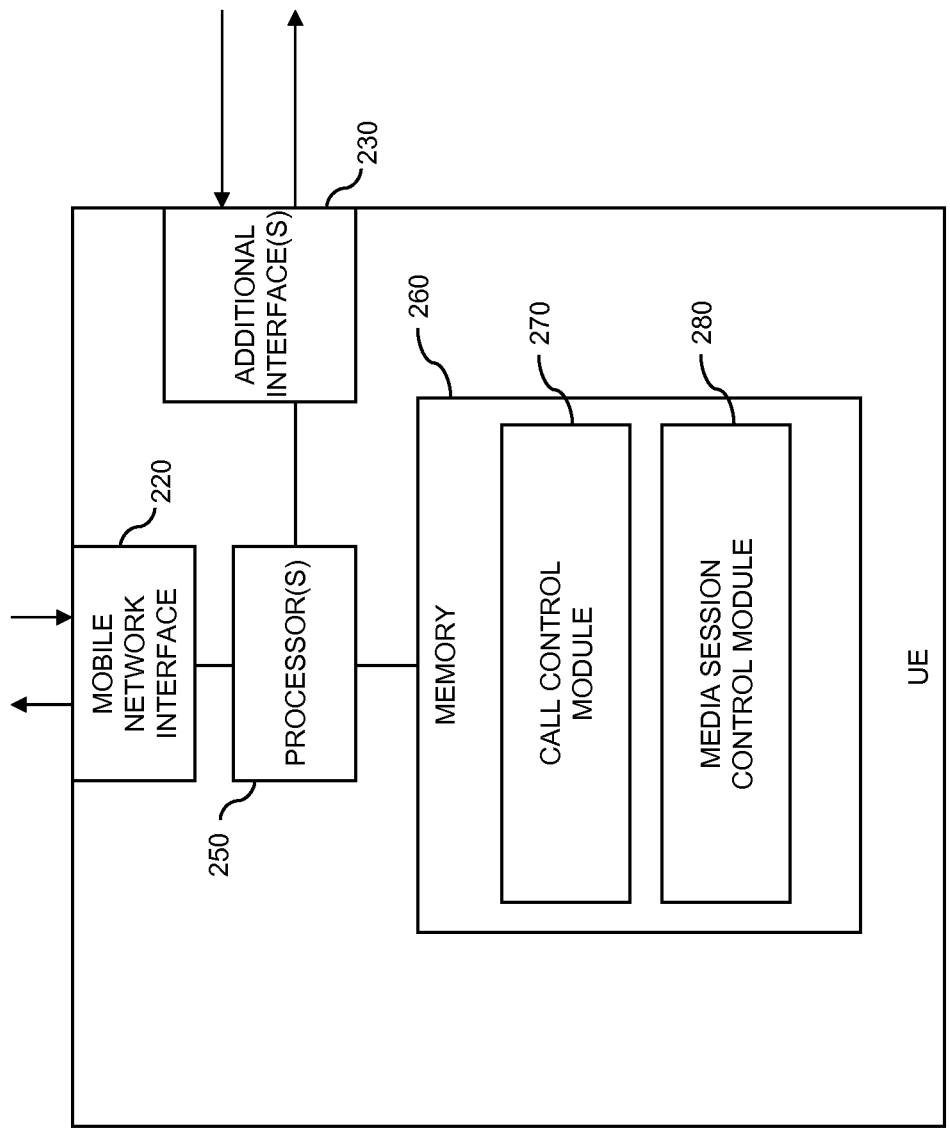
FIG. 12 schematically illustrates a UE in accordance with an embodiment of the invention.

FIG. 12 illustrates exemplary structures for implementation of the above concepts in a UE, e.g., in the UE 50-1 or in the UE 50-2.

As illustrated, the UE includes an interface 220. The interface 220 may for example be based on a cellular radio access technology for connecting to a mobile network. In addition, the UE may include one or more additional interfaces 230, e.g., a WLAN interface or a Bluetooth interface. The additional interface(s) 230 may be used for establishing the above-mentioned functional connection to another device. Alternatively or in addition, the additional interface(s) may be used for providing an additional IP connectivity path of the UE, e.g., for establishing the additional user plane directly from the UE as for example explained in connection with FIG. 8.

Further, the UE includes at least one processor 250 coupled to the interfaces 220, 230, and a memory 260 coupled to the at least one processor 250. The memory 260 may include a read-only memory (ROM), e.g., a flash ROM, a random-access memory (RAM), e.g., a dynamic RAM (DRAM) or static RAM (SRAM), a mass storage, e.g., a hard disk or solid state disk, or the like. The memory 260 may include suitably configured program code to be executed by the processor 250 so as to implement the above-described functionalities of the UE. More specifically, the program code in the memory 260 may include a call control module 270 so as to implement sending, receiving, and processing of control plane session messages in the above-mentioned manner. Further, the program code in the memory 260 may include a media session control module 280 so as to implement the above-described functionalities of handling media sessions, in particular of the unmanaged media session over the additional user plane 80.

It is to be understood that the structures as illustrated in FIG. 12 are merely schematic and that the UE may actually include further components which, for the sake of clarity, have not been illustrated, e.g., further interfaces or additional processors. Also, it is to be understood that the memory 260 may include further types of program code modules which have not been illustrated, e.g., program code modules for implementing known functionalities of a UE.

Figure 13:
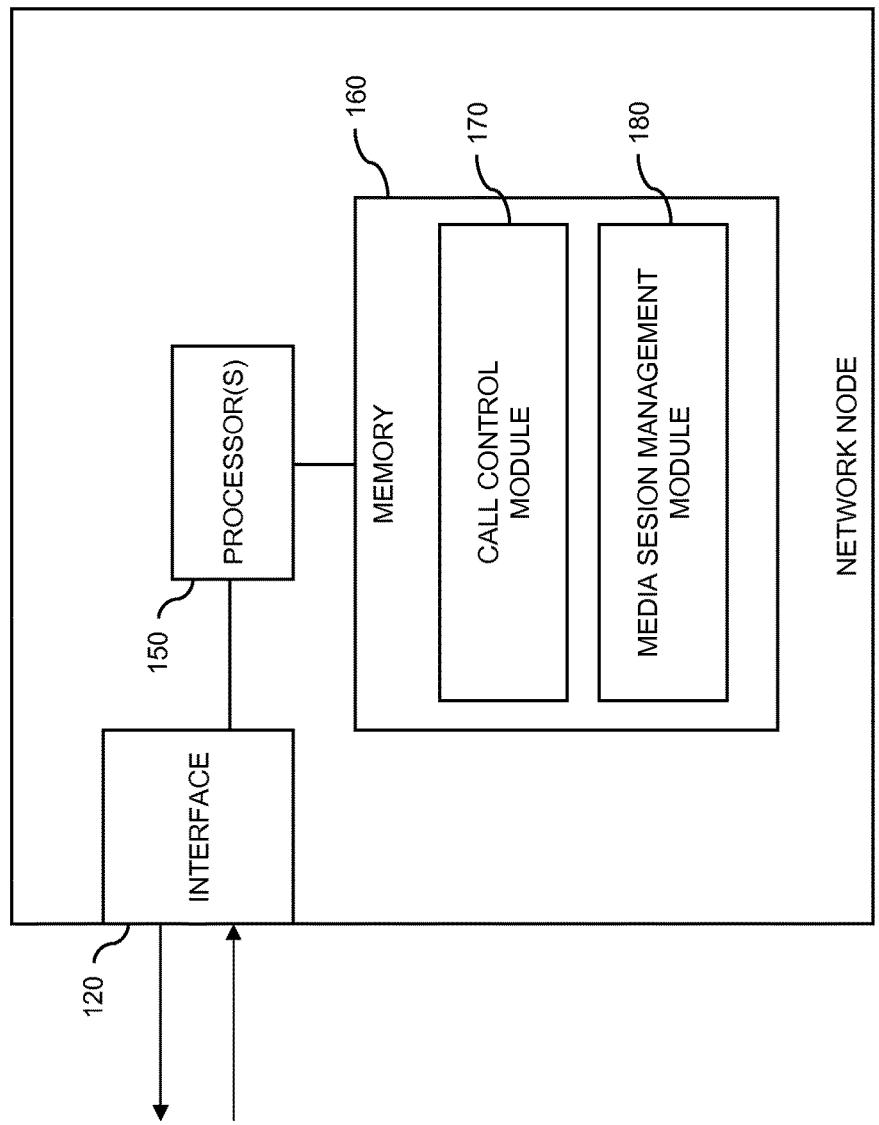
FIG. 13 schematically illustrates a network node in accordance with an embodiment of the invention.

FIG. 13 illustrates exemplary structures for implementation of the above concepts in a network node, in particular in a node of an IP multimedia system such as the IMS node 110.

As illustrated, the node includes an interface 120. The interface 120 may be used for communication with one or more UEs. Here, it should be understood that such communication would typically be performed indirectly over one or more further nodes, e.g., other nodes of the IP multimedia system or nodes of an access network.

Further, the node 110 includes at least one processor 150 coupled to the interface 120, and a memory 160 coupled to the at least one processor 150. The memory 160 may include a ROM, e.g., a flash ROM, a RAM, e.g., a DRAM or SRAM, a mass storage, e.g., a hard disk or solid state disk, or the like. The memory 160 may include data and suitably configured program code to be executed by the processor 150 so as to implement the above-described functionalities of the node of the IP multimedia system or IMS node 110. More specifically, the program code in the memory 160 may include a call control module 170 so as to implement sending, receiving, and processing of control plane session messages in the above-mentioned manner. Further, the program code in the memory 160 may include a media session management module 180 so as to implement the above-described functionalities of managing media sessions.

It is to be understood that the structures as illustrated in FIG. 13 are merely schematic and that the node may actually include further components which, for the sake of clarity, have not been illustrated. Also, it is to be understood that the memory 160 may include further types of program code modules, which have not been illustrated, e.g., program code modules for implementing known functionalities of an IMS node.

As can be seen, the concepts as described above may be used for improving utilization of multimedia enhancements of a packet based call. In particular, an IMS based call may be enhanced by an additional media session for which no management by the IMS is needed. Accordingly, the additional media session may also be terminated on other devices not supporting IMS, e.g., a media rendering and/or capturing device connected to the UE, such as a smart TV or multimedia computer. Such device would not need to support IMS or SIP. In this way, a high quality user experience for the multimedia enhancements can be achieved. Further, resources of the UE and of a mobile network through which the IMS based call is established may be saved. Further, the concepts do not require integration of access technology used for the additional media session with the infrastructure of the mobile network providing the IMS. Rather, any kind of access technology provided by various operators may be used for the additional media session.

It is to be understood that the examples and embodiments as explained above are merely illustrative and susceptible to various modifications. For example, the concepts could be used in other types of mobile network, which are based on different types or combinations of access technologies. Also, the concepts may be extended to multiple managed sessions and multiple unmanaged sessions. Further, it is to be understood that the above concepts may be implemented by using correspondingly designed software in existing devices, or by using dedicated device hardware.

The invention claimed is:

1. A method of controlling a packet based call between a local party and a remote party, the method comprising:
    a user equipment associated with the local party establishing a control plane session of the call with an Internet Protocol multimedia system;
    the user equipment establishing a media session of the call, the media session being managed by the Internet Protocol multimedia system;

the user equipment determining a local endpoint for terminating an additional media session at the local party, the local endpoint implemented by a device controlled by the user equipment;

the user equipment sending a first message of the control plane session to the Internet Protocol multimedia system, the first message indicating the local endpoint and that management actions of the additional media session by the Internet Protocol multimedia system is not required;

the user equipment receiving a second message of the control plane session from the Internet Protocol multimedia system, the second message indicating a remote endpoint configured by the remote party for terminating the additional media session at the remote party and for use by the remote party for transfer of media between the local endpoint and the remote endpoint;

the user equipment configuring the local endpoint for transfer of media with the remote endpoint indicated by the second message; and the user equipment using the local endpoint for transfer of media between the local endpoint and the remote endpoint.

2. The method according to claim 1,
wherein the control plane session and the media session of the call are associated with a first network identity of the user equipment; and
wherein the local endpoint for terminating the additional media session is associated with a second network identity which is different from the first network identity.

3. The method according to claim 1, comprising:
the user equipment indicating information for establishment of the additional media session to the local endpoint.

4. The method according to claim 1, comprising:
the user equipment reserving resources for the additional media session at the local endpoint.

5. The method according to claim 1, comprising:
the user equipment receiving information for establishment of the additional media session from the local endpoint; and
depending on the received information, the user equipment generating the first message of the control plane session.

6. The method according to claim 1,
wherein the local endpoint is implemented by a media rendering and/or capturing device connected to the user equipment.

7. The method according to claim 1,
wherein the local endpoint is implemented in the user equipment.

8. The method according to claim 1,
wherein the media session is established via a first access technology; and
wherein the additional media session is established via a second access technology which is different from the first access technology.

9. A method of controlling a packet based call between a local party and a remote party, the method comprising:
a node of an Internet Protocol multimedia system establishing a control plane session of the call with a user equipment associated with the local party;
the node managing a media session of the call;
the node receiving a first message of the control plane session from the user equipment, the first message indicating a local endpoint for terminating an additional media session at the local party and be used by the user equipment to transfer media between the local party and the remote party via the local endpoint and that management actions of the additional media session by the Internet Protocol multimedia system is not required, the local endpoint implemented by a device controlled by the user equipment;

the node, responsive to receiving a message from the remote party indicating a remote endpoint configured by the remote party for terminating the additional media session at the remote party and for use by the remote party to transfer media between the remote party and the local party via the remote endpoint, sending a second message of the control plane session to the user equipment, the second message indicating the remote endpoint for terminating the additional media session at the remote party.

10. The method according to claim 9,
wherein the node determines the remote endpoint from a message of a further control plane session of the call, the further control plane session being established with the remote party.

11. The method according to claim 9,
wherein the control plane session and the media session are associated with a first network identity of the user equipment; and
wherein the local endpoint is associated with a second network identity which is different from the first network identity.

12. The method according to claim 9,
wherein the local endpoint is implemented by a media rendering and/or capturing device connected to the user equipment.

13. The method according to claim 9,
wherein the local endpoint is implemented in the user equipment.

14. The method according to claim 9,
wherein the media session of the call is established via a first access technology; and
wherein the additional media session of the call is established via a second access technology which is different from the first access technology.

15. A user equipment, comprising:
at least one interface and at least one processor,
wherein the at least one processor is configured to:
via the at least one interface, establish a control plane session of a call with an Internet Protocol multimedia system, the call being between a local party associated with the user equipment, and a remote party;
via the at least one interface, establish a media session of the call, the media session being managed by the Internet Protocol multimedia system;
determine a local endpoint for terminating an additional media session at the local party, the local endpoint implemented by a device controlled by the user equipment;
via the at least one interface, send a first message of the control plane session to the Internet Protocol multimedia system, the first message indicating the local endpoint of the additional media session and that management actions of the additional media session by the Internet Protocol multimedia system is not required;
via the at least one interface, receive a second message of the control plane session from the Internet Protocol multimedia system, the second message indicating a remote endpoint configured by the remote party for terminating the additional media session at the remote party and for use by the remote party for transfer of media between the local endpoint and the remote endpoint;

configure the local endpoint for transfer of media with the remote end point indicated by the second message; and use the local endpoint to transfer media between the local endpoint and the remote endpoint.

16. The user equipment according to claim 15,
wherein the control plane session and the media session of the call are associated with a first network identity of the user equipment; and
wherein the local endpoint for terminating the additional media session is associated with a second network identity which is different from the first network identity.

17. The user equipment according to claim 15,
wherein the at least one processor is further configured to:
indicate information for establishment of the additional media session to the local endpoint.

18. The user equipment according to claim 15,
wherein the at least one processor is further configured to:
reserve resources for the additional media session at the local endpoint.

19. The user equipment according to claim 15,
wherein the at least one processor is further configured to:
receive information for establishment of the additional media session from the local endpoint; and
depending on the received information, generate the first message of the control plane session.

20. The user equipment according to claim 15,
wherein the local endpoint is implemented by a media rendering and/or capturing device connected to the user equipment.

21. The user equipment according to claim 15,
wherein the local endpoint is implemented in the user equipment.

22. The user equipment according to claim 15,
wherein the media session is established via a first access technology; and
wherein the additional media session is established via a second access technology which is different from the first access technology.

23. A node for an Internet Protocol multimedia system, the node comprising:
at least one interface and at least one processor,
wherein the at least one processor is configured to:
via the at least one interface, establish a control plane session of a call with a user equipment, the call being between a local party associated with the user equipment, and a remote party;
manage a media session of the call;
via the at least one interface, receive a first message of the control plane session from the user equipment, the first message indicating a local endpoint for terminating an additional media session at the local party and that management actions of the additional media session by the Internet Protocol multimedia system is not required, the local endpoint implemented by a device controlled by the user equipment, and
via the at least one interface, responsive to receiving a message from the remote party indicating a remote endpoint configured by the remote party for terminating the additional media session at the remote party and for use by the remote party to transfer media between the remote party and the local party via the remote endpoint, send a second message of the control plane session to the user equipment, the second message indicating a remote endpoint for terminating the additional media session at the remote party.

24. The node according to claim 23,
wherein the at least processor is further configured to:
determine the remote endpoint from a message of a further control plane session of the call, the further control plane session being established with the second party.

25. The node according to claim 23,
wherein the control plane session and the media session are associated with a first network identity of the user equipment; and
wherein the local endpoint of the additional media session is associated with a second network identity which is different from the first network identity.

26. The node according to claim 23,
wherein the local endpoint of the additional media session is implemented by a media rendering and/or capturing device connected to the user equipment.

27. The node according to claim 23,
wherein the local endpoint of the additional media session is implemented in the user equipment.

28. The node according to claim 23,
wherein the media session of the call is established via a first access technology; and
wherein the additional media session of the call is established via a second access technology which is different from the first access technology.

29. A computer program product comprising a non-transitory computer readable storage medium storing program code to be executed by at least one processor of a user equipment to cause the user equipment to operate in accordance with the method as defined by claim 1.

30. A computer program product comprising a non-transitory computer readable storage medium storing program code to be executed by at least one processor of a node of an Internet Protocol multimedia system, to cause the node to operate in accordance with the method as defined by claim 9.

* * * * *